(12) United States Patent
Yamazaki

(10) Patent No.: US 7,093,074 B2
(45) Date of Patent: Aug. 15, 2006

(54) STORAGE CONTROL DEVICE AND STORAGE CONTROL METHOD

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

(21) Appl. No.: 10/197,459

(22) Filed: Jul. 18, 2002

(65) Prior Publication Data

US 2003/0005227 A1    Jan. 2, 2003

Related U.S. Application Data

(63) Continuation of application No. PCT/JP00/00234, filed on Jan. 19, 2000.

(51) Int. Cl.
*G06F 12/00*    (2006.01)

(52) U.S. Cl. .................. 711/119; 711/118; 711/147; 711/151; 711/154; 711/158; 711/165; 712/238

(58) Field of Classification Search .............. 711/119, 711/118, 147, 151, 154, 158, 165; 712/238
See application file for complete search history.

(56) References Cited

U.S. PATENT DOCUMENTS

| | | | |
|---|---|---|---|
| 4,472,790 A * | 9/1984 | Burk et al. ............. 711/164 |
| 4,905,141 A * | 2/1990 | Brenza ................... 711/129 |
| 5,467,473 A | 11/1995 | Kahle et al. ............ 712/23 |
| 5,745,721 A * | 4/1998 | Beard et al. ............ 712/208 |
| 5,802,588 A | 9/1998 | Ramagopal et al. ..... 711/156 |
| 5,832,297 A | 11/1998 | Ramagopal et al. ..... 710/5 |
| 5,958,045 A * | 9/1999 | Pickett .................. 712/229 |
| 5,978,830 A * | 11/1999 | Nakaya et al. ......... 718/102 |
| 6,122,712 A | 9/2000 | Torii .................... 711/141 |
| 6,185,675 B1 * | 2/2001 | Kranich et al. ........ 712/238 |
| 2001/0037435 A1 * | 11/2001 | Van Doren .............. 711/153 |

FOREIGN PATENT DOCUMENTS

| JP | 57-1354925 | | 8/1982 |
|---|---|---|---|
| JP | 61-118853 | | 6/1986 |
| JP | 61-029933 | * | 1/1989 |
| JP | 64-029933 | | 1/1989 |
| JP | 2-204834 | | 8/1990 |
| JP | 6-214875 | | 8/1994 |
| JP | 6-301600 | | 10/1994 |
| JP | 7-160501 | | 6/1995 |
| JP | 10-116192 | | 5/1998 |

OTHER PUBLICATIONS

English Translation of Office Action issued from corresponding Japanese Patent Application 2001-554179.

* cited by examiner

*Primary Examiner*—Stephen C. Elmore
(74) *Attorney, Agent, or Firm*—Staas & Halsey LLP

(57) ABSTRACT

A storage control device, and method, the storage control device including storers, such as buffers, which store data and a storage controller. The storage controller, in response to a data issue request identifying an issue order, selects one of the storers. Data is output that corresponds to a particular address in the selected storer. The storage control method includes providing a data issue request identifying an issue order, and comparing identifications of storers, with the identification in the data issue request. The method further includes selecting a storer and outputting data from the selected storer that corresponds to an address.

5 Claims, 11 Drawing Sheets

FIG.4

| IID | INSTRUCTION | REQUIRED ADDRESS |
|---|---|---|
| 0 | INSTRUCTION MVC | |
| 1 | FETCH 1 | ADR1-1 |
| 2 | STORE 1 | ADR2-1 |
| 3 | FETCH 2 | ADR1-2 |
| 4 | STORE 2 | ADR2-2 |
| ⋮ | ⋮ | ⋮ |
| 2m-1 | FETCH m | ADR1-m |
| 2m | STORE m | ADR2-m |

STORAGE CONTROL DEVICE AND STORAGE CONTROL METHOD

CROSS REFERENCE TO RELATED APPLICATION

This application is a U.S. continuation application filed under 35 U.S.C. §111 (a) claiming priority under 35 U.S.C. 120 and 365(c) of PCT application JP00/00234, filed Jan. 19, 2000.

BACKGROUND OF THE INVENTION

1. Field of the Invention

The present invention relates to storage control devices and storage control methods, and more particularly to a storage control device and a storage control method that include a plurality of store buffers and store or fetch with respect to the plurality of store buffers.

2. Description of Related Art

A conventional processing unit includes a store buffer to temporarily maintain data that is to be written to cache memory or main memory. A store process can be completed by providing the store buffer, before a preparation of writing, the data to cache memory or main memory.

In the processing unit, when it is detected that store data is in the store buffer, which has not completed writing data to cache memory or main memory is subjected to a fetch for a following process, a retriever for retrieving data to be fetched from the store buffer retrieves the store data in the store buffer. Using the retriever, a fetch request can be completed before the store data is written in the cache memory or the main memory.

In the case described above, to check whether or not one store area indicated by one fetch request overlaps another store area indicated by another fetch request, the fetch request, a store request, an address, and a byte mark to be processed are checked.

Accordingly, if it is required to repeatedly execute a plurality of instructions in response to a request for improving a process performance of a device, a plurality of store requests or a plurality of fetch requests with respect to the same area at the same time occurs. In this state, when a store buffer is selected to fetch by an address and a byte mark, data in a different store buffer is required for each of the fetch requests in a case in which each of the fetch requests indicates the same area to fetch. Thus, it is difficult to accurately indicate the store buffer storing data to be fetched for each of the fetch requests occurring at the same time.

Accordingly, in a state in which there are a plurality of store requests and a plurality of fetch requests that operate on the same storage area, there is a problem in that in order to properly process a current fetch request, the current fetch request is required to wait until other preceding store requests are actually processed, that is, until only one preceding store request remains in the store buffer and it completes writing to cache memory or main memory.

SUMMARY OF THE INVENTION

A processing unit according to the present invention includes a plurality of store buffers temporarily storing store data, selects a predetermined store buffer from the plurality of store buffers by corresponding to identification in a data issue request when the data issue request, in which the identification for identifying an execution order in response to an instruction is provided, is supplied, and outputs predetermined data from the predetermined buffer by corresponding to the address.

According to an aspect of the present invention, in the processing unit, even in a state in which a plurality of store requests and a plurality of fetch requests simultaneously indicate the same store area to operate on, it is possible to fetch data from the store buffer by detecting the identification provided in the instruction.

Moreover, a process is conducted by a byte mark unit of the store buffer but not by an entire store buffer unit, so that in a state in which the plurality of store requests and the plurality of fetch requests simultaneously indicate the same store area to operate on, fetch data is correctly fetched from the plurality of store buffers by properly combining the store buffers to select for each fetch request.

BRIEF DESCRIPTION OF THE DRAWINGS

FIG. 4 is a diagram for explaining a method for generating instruction identification according to an aspect of the present invention;

DETAILED DESCRIPTION OF THE PREFERRED EMBODIMENT

Figure 1:
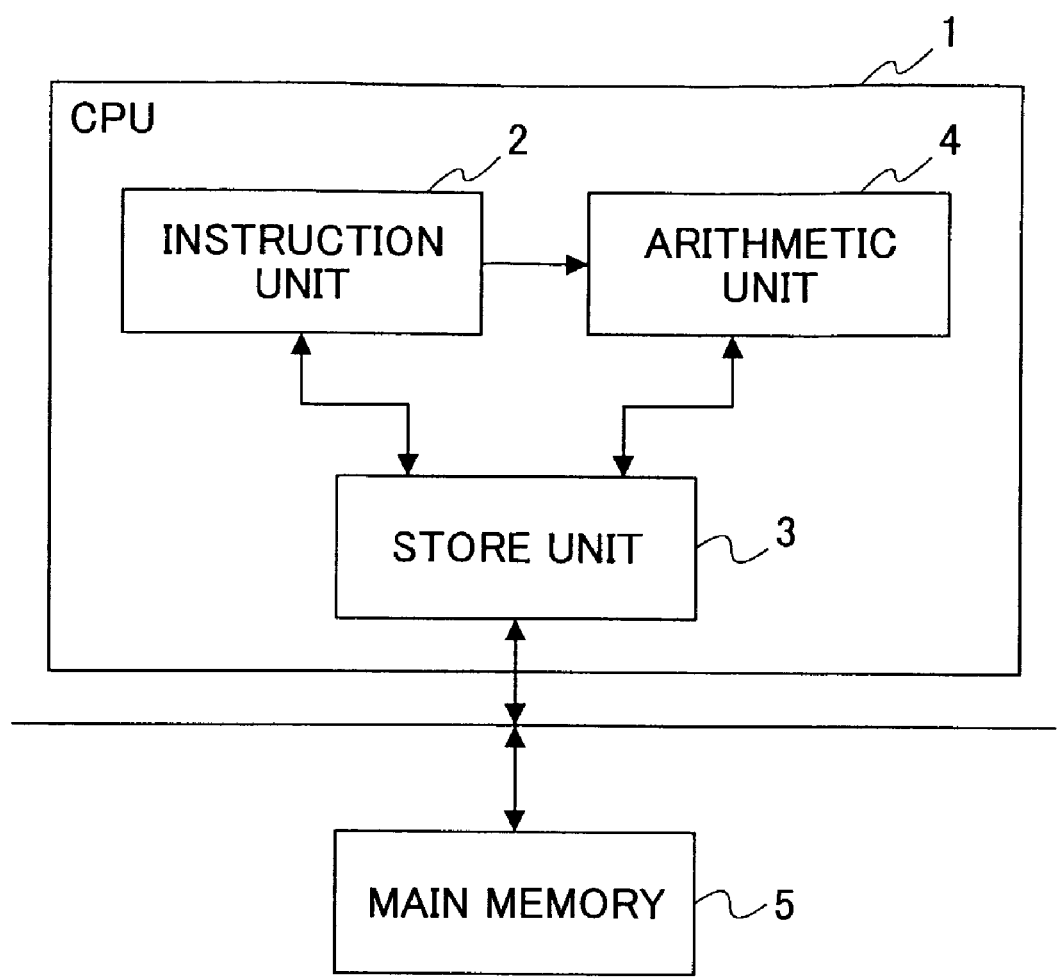
FIG. 1 is a block diagram showing a configuration according to aspect of the present invention.

FIG. 1 is a block diagram showing a configuration according to an aspect of the present invention. A processing unit 1 includes an instruction unit 2, a store unit 3, and an arithmetic unit 4. The instruction unit 2 analyzes an instruction, requests necessary data for the store unit 3, and also controls the arithmetic unit 4. The store unit 3 processes and manages data based on the request from the instruction unit 2.

Data is supplied from the store unit 3 to the arithmetic unit 4, and the arithmetic unit 4 conducts an arithmetic operation based on an instruction from the instruction unit 2 with respect to the data from the store unit 3. An arithmetic operation result by the arithmetic unit 4 is maintained by the store unit 3.

Figure 2:
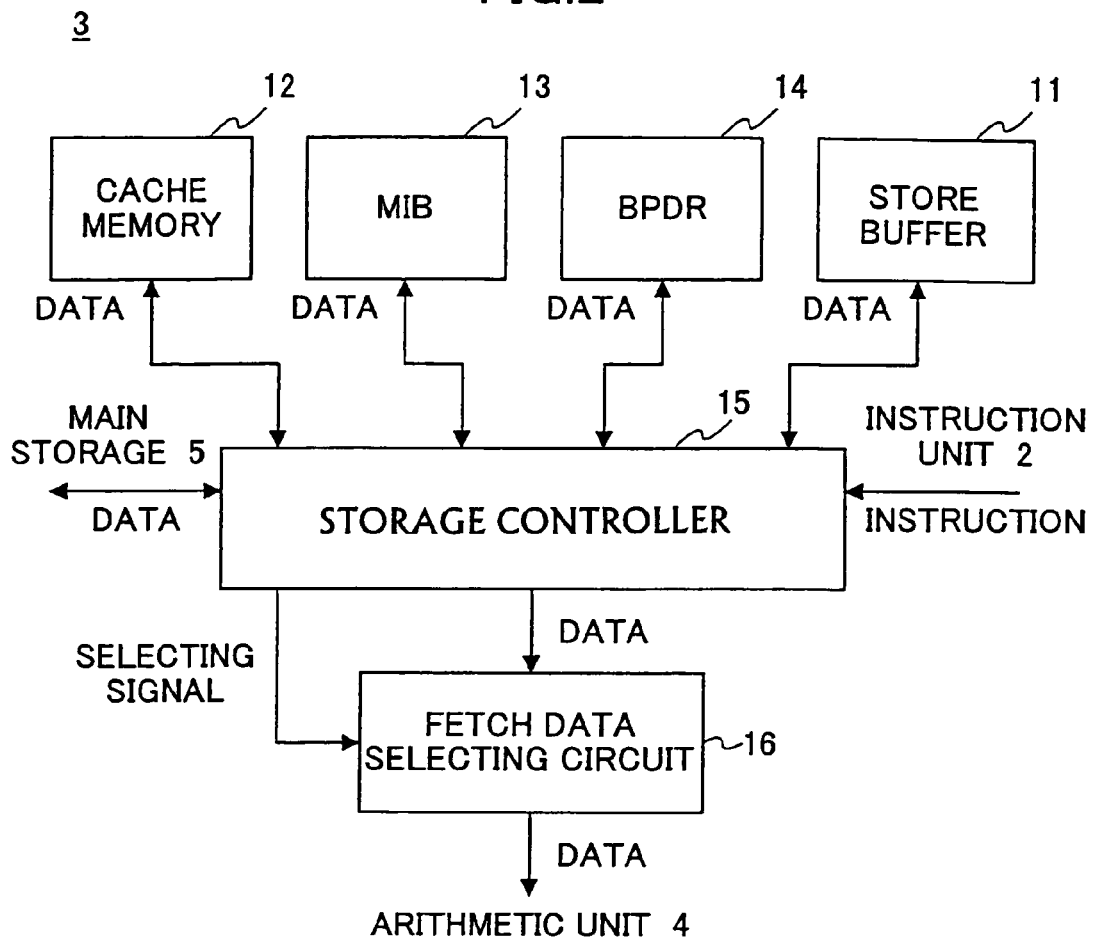
FIG. 2 is a block diagram showing a configuration of a store unit according to an aspect of the present invention.

Next, the store unit 3 will be described in detail. A store unit according to an aspect of the present invention includes one or various types and numbers of storers e.g., buffer(s), memory(s), cache memory(s), etc. FIG. 2 is a block diagram showing a configuration of the store unit according to an aspect of the present invention. The store unit 3 includes a store buffer 11, a cache memory 12, a move-in-data (MIB) buffer 13, a bypass-data-register (BPDR) 14, a storage controller 15, and a data selecting circuit 16.

The store buffer 11 includes store buffers (store buffers 11-1 through 11-$n$), and each of the store buffers 11-1 through 11-$n$ stores data. The store buffers 11-1 through 11-$n$ store data that is fetched based on the instruction from the instruction unit 2. The cache memory 12, the move-in-data buffer 13, and the bypass-data-register 14 temporarily maintain data to be used by the arithmetic unit 4.

Figure 3:
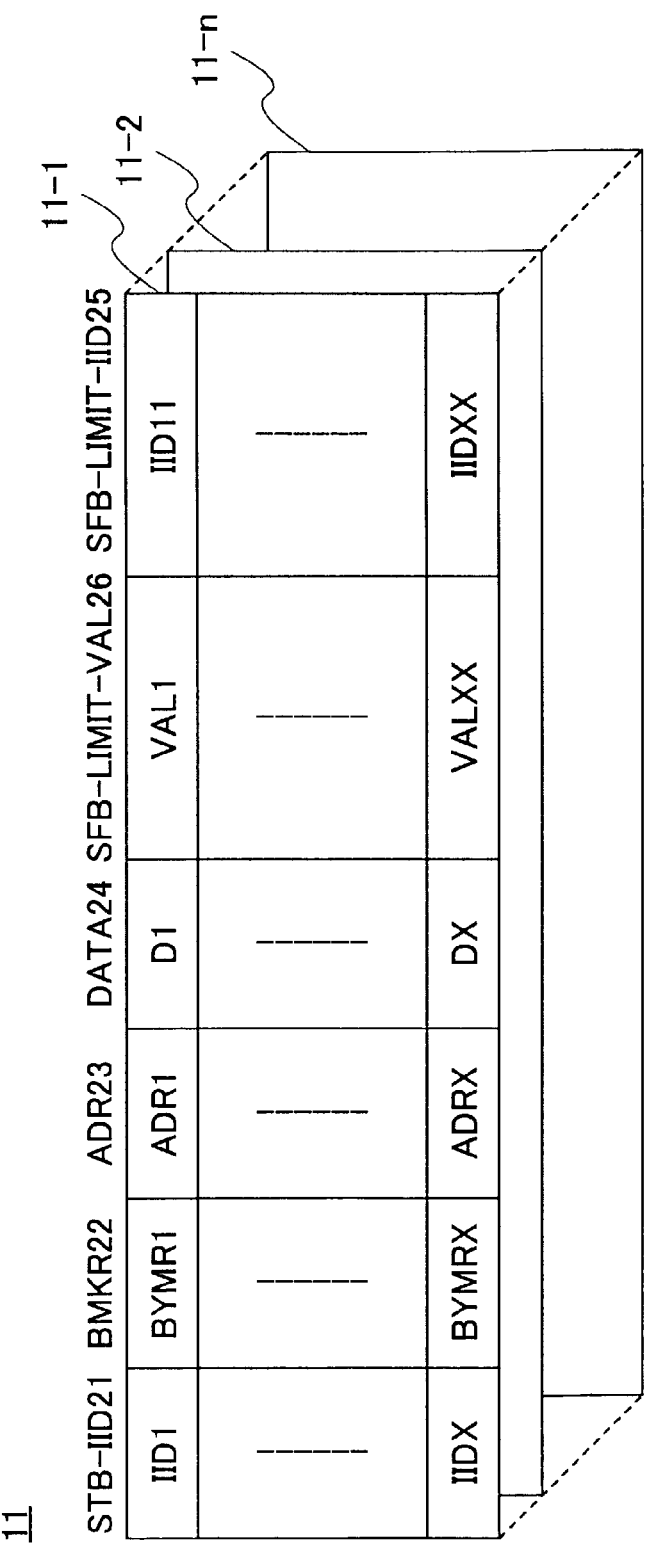
FIG. 3 is a table showing a data configuration of a store buffer according to an aspect of the present invention.

The store buffers 11-1 through 11-$n$ will be described in detail. FIG. 3 is a table showing a configuration of the store buffers according to the an aspect of the present invention. The store buffers 11-1 through 11-$n$ each include an instruction identification storage 21, a byte mark storage 22, an address storage 23, a data storage 24, a store fetch bypass upper limitation instruction identification storage 25, and a store fetch bypass upper instruction identification valid information storage 26.

The instruction identification storage 21 stores an instruction identification (IID: Instruction ID). The instruction identification IID is information identifying an execution order of each request. The instruction identification IID is provided by the instruction unit 2.

The instruction identification IID will be described in detail. FIG. 4 is a diagram for explaining a method for generating instruction identification according to an aspect of the present invention. An instruction "MVC" will be described. For example, the instruction "MVC" is described as "MVC 190 ADR1 ADR2." The instruction "MVC" shown in FIG. 4 is an instruction for moving data having a 190-byte operand length from an address ADR1 to an address ADR2.

As shown in FIG. 4, fetches FETCH 1 through FETCH m and stores STORE 1 through STORE m are alternately requested so that the instruction "MVC" is executable. The fetches FETCH 1 through FETCH m are instructions for fetching data from the addresses ADR1-1 through ADR1-$m$. The stores STORE 1 through STORE m are instructions for storing data at the addresses ADR2-1 through ADR2-$m$. In this case, when the identification identifying the instruction "MVC" is "0", the identifications IID 1 through 2$m$ are given to the fetches FETCH 1 through FETCH m and stores STORE 1 through STORE m constituting the instruction "MVC" in the request order. That is, the identification IID corresponds to the execution order of the instructions.

The byte mark storage 22 stores a byte mark indicating various data positions (e.g., indicates a position of a byte to be stored and is set according to an address and operand length of a store instruction) and locations including, for example, a data position within a register. For example, the byte mark BMK consists of information of 16 bits that identifies a store location by an address. The address store 23 stores the address contained in the applicable byte mark. The address is information identifying the store location of the store buffers 11-1 through 11-$n$. For example, one of the bits in the byte mark can have a value set to indicate that the bit corresponds to the byte in which data is to be stored.

The data storage 24 stores data. The data are data to be stored. The store fetch bypass upper limitation instruction identification storage 25 stores a store fetch bypass upper limit instruction identification (SFB-LIMIT-IID). The store fetch bypass upper limit instruction identification SFB-LIMIT-IID is identification information for identifying data in which an overlap is detected, and corresponds to the identification IID of overlapped data.

The storage controller 15 controls the store buffer 11, the cache memory 12, the move-in-data buffer 13, the bypass data register 14, and the fetch data selecting circuit 16 in response to instructions from the instruction unit 2.

Figure 5:
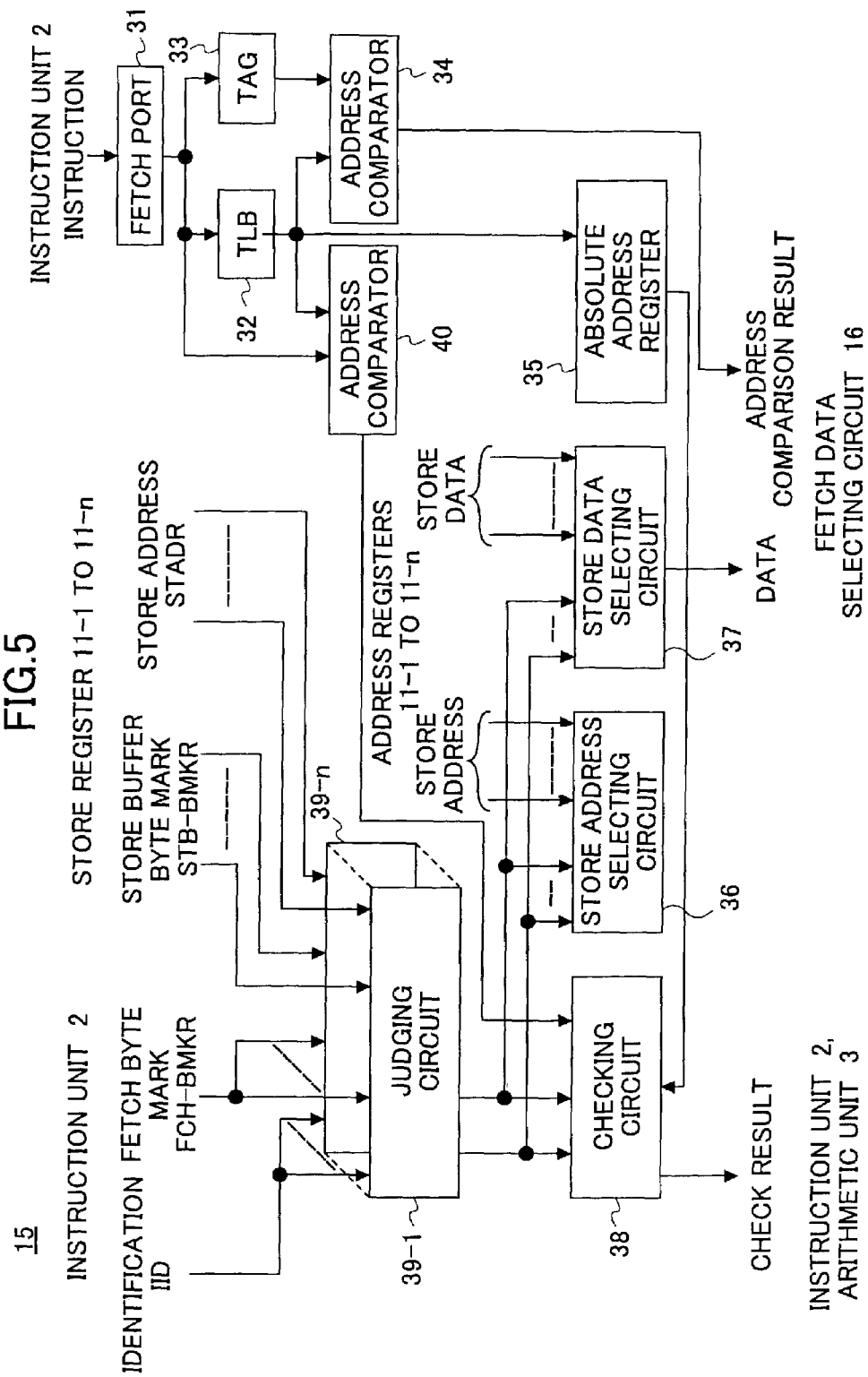
FIG. 5 is a block diagram showing a configuration of a storage controller according to an aspect of the present invention.

The storage controller 15 will be described in detail. FIG. 5 is a block diagram showing the configuration of the storage controller according to an aspect of the present invention.

The storage 15 includes a fetch port 31, a translation look-aside buffer (TLB; Translation Look-aside Buffer) 32, a tag buffer 33, a tag match detecting address comparator 34, an absolute address register 35, a store address selecting circuit 36, a store data selecting circuit 37, a checking circuit 38, judging circuits 39-1 through 39-$n$, and a TLB detecting address comparator 40.

The fetch port 31 maintains an instruction from the instruction unit 2. The instruction maintained by the fetch port 31 is supplied to the translation look-aside buffer 32, the tag buffer 33, and the cache memory 12.

The translation look-aside buffer 32 converts a fetch logical address to an absolute address. The absolute address converted by the translation look-aside buffer 32 is supplied to the tag match detecting address comparator 34, the absolute address register 35, and the checking circuit 38.

The tag buffer 33 converts a fetch address to a tag address. The tag address converted by the tag buffer 33 is supplied to the tag match detecting address comparator 34.

The cache memory 12 outputs data corresponding to the fetch logical address. The data output from the cache memory 12 are supplied to the fetch data selecting circuit 16.

The tag match detecting address comparator 34 compares the absolute address with the tag address, and detects a consistency or an inconsistency between the absolute address and the tag address. A comparison result of the tag match detecting address comparator 34 is supplied to the checking circuit 38 and the fetch data selecting circuit 16.

The absolute address register 35 maintains the absolute address converted by the translation look-aside buffer 32. The absolute address maintained by the absolute address register 35 is supplied to the checking circuit 38.

The store address selecting circuit 36 controls to output an address based on a judgment result of the judging circuit 39. The address selected by the store address selecting circuit 36 is supplied to the checking circuit 38.

The store data selecting circuit 37 controls to output data based on the judgment result of the judging circuit 39. The data selected by the store data selecting circuit 37 are supplied to the fetch data selecting circuit 16.

In addition, the address is supplied from the translation look-aside buffer 32 and the fetch port 31 to the TLB detecting address comparator 40. The TLB detecting address comparator 40 compares the logical address from the translation look-aside buffer 32 with the logical address which is supplied from the fetch port 31 and is not used for a TLB search, and detects the consistency/inconsistency between both addresses. The comparison result of the TLB detecting address comparator 40 is supplied to the checking circuit 38.

Figure 6:
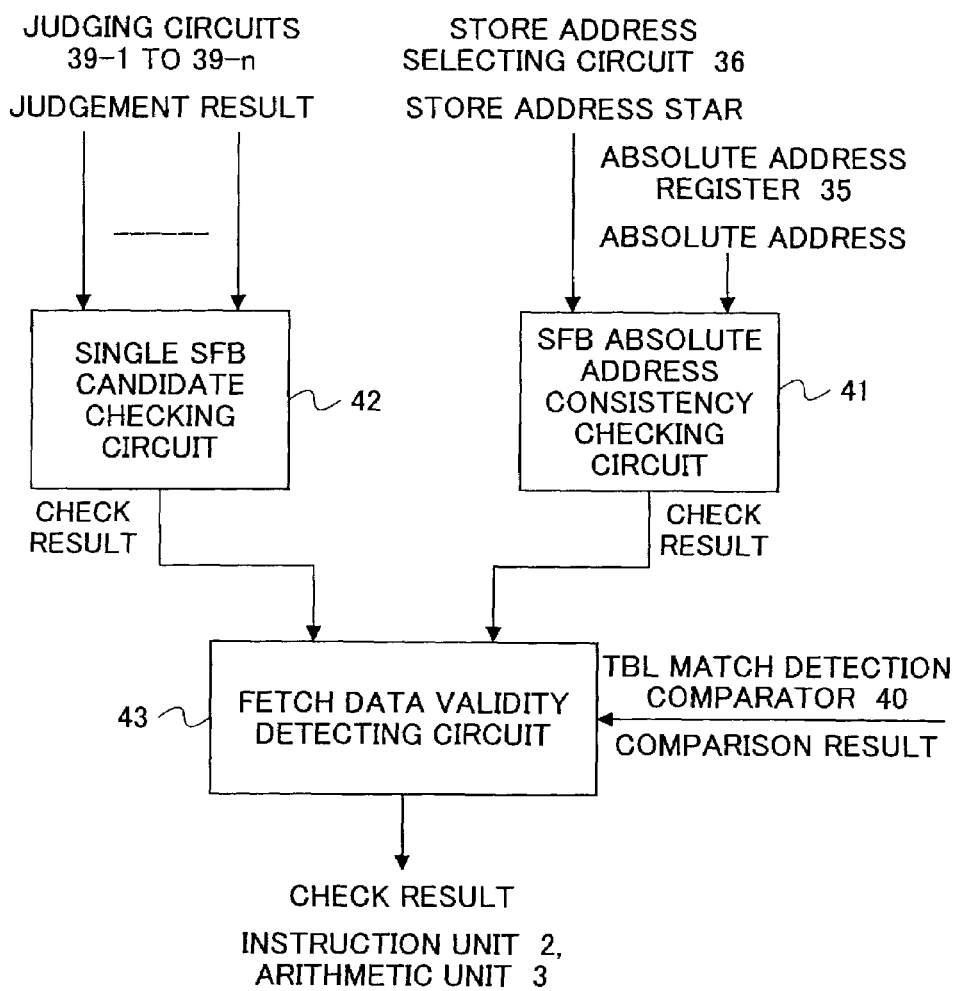
FIG. 6 is a block diagram showing a checking circuit according to an aspect of the present invention.

The checking circuit 38 will be described in detail. FIG. 6 is a block diagram showing the configuration of the checking circuit according to an aspect of the present invention.

The checking circuit 38 includes an absolute address consistency checking circuit 41, a single fetch candidate checking circuit 42, and a fetch data validity condition detecting circuit 43. The absolute address is supplied from the absolute address register 35 to the absolute address consistency checking circuit 41 and also the store address is supplied from the store address selecting circuit 36 to the absolute address consistency checking circuit 41. The absolute address consistency checking circuit 41 compares the absolute address from the absolute address register 35 with the store address from the store address selecting circuit 36, and checks the consistency or inconsistency. A check result of the absolute address consistency checking circuit 41 is supplied to the fetch data validity condition detecting circuit 43.

Check results of the n checking circuits 39-1 through 39-n are supplied to the single fetch candidate checking circuit 42. The single fetch candidate checking circuit 42 checks whether or not a fetch candidate is single based on the check results of the n checking circuits 39-1 through 39-n.

The comparison result of the TLB detecting address comparator 40, a check result of the absolute address consistency checking circuit 41, and the single fetch candidate checking circuit 42 are supplied to the fetch data validity condition detecting circuit 43. The fetch data validity condition detecting circuit 43 outputs information showing that the fetch data are valid when all of the comparison result of the TLB detecting address comparator 40, the check result of the absolute address consistency checking circuit 41, and the single fetch candidate checking circuit 42 are valid. An output of the absolute address consistency checking circuit 41 is supplied to the instruction unit 2 and the arithmetic unit 3. The instruction unit 2 and the arithmetic unit 3 control the instruction and the arithmetic operation, respectively, in response to the output of the absolute address consistency checking circuit 41.

The judging circuits 39-1 through 39-n compare the instruction and the addresses, the byte marks, and the identifications IID of the store buffers 11-1 through 11-n, respectively, and select data that are to be validated.

Figure 7:
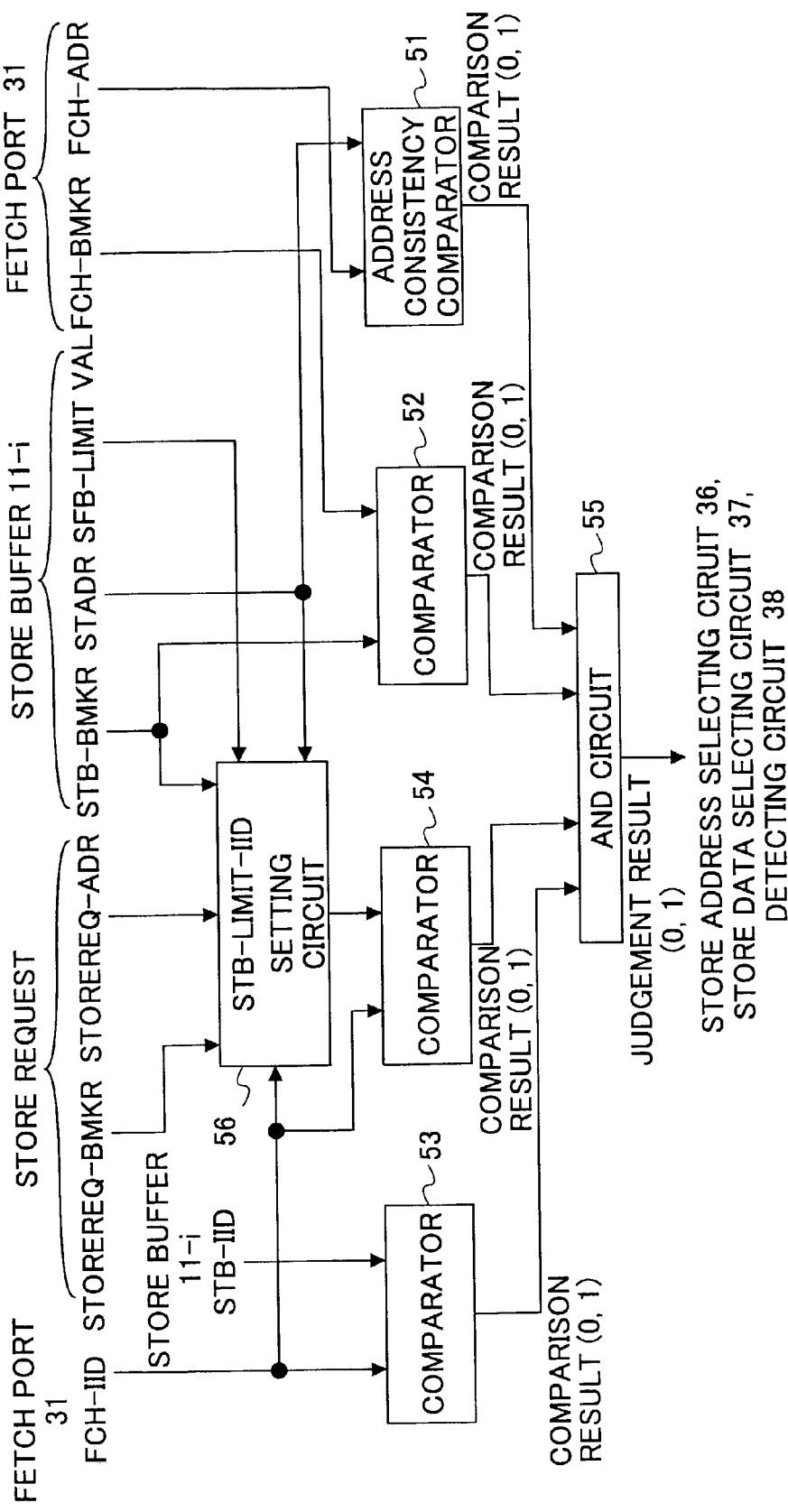
FIG. 7 is a block diagram showing a determining circuit according to an aspect of the present invention.

The judging circuits 39-1 through 39-n will be described in detail. FIG. 7 is a block diagram showing the configuration of the judging circuits according to an aspect of the present invention.

The judging circuits 39-i each includes an address consistency comparator 51, a byte mark comparator 52, an STB-IID comparator 53, an SFB-LIMIT-IID comparator 54, an AND circuit 55, and an SBF-LIMIT-IID detecting circuit 56.

The address is supplied from the store buffer 11-i to the address consistency comparator 51 and the fetch logical address is supplied from the fetch port 31 to the address consistency comparator 51. The address consistency comparator 51 compares the address from the store buffer 11-i with the fetch logical address from the fetch port 31 and detects the consistency/inconsistency between the address from the store buffer 11-i and the fetch logical address from the fetch port 31. The address consistency comparator 51 outputs a logical value "1" when the address from the store buffer 11-i is consistent with the fetch logical address from the fetch port 31, and outputs a logical value "0" when the address from the store buffer 11-i is inconsistent with the fetch logical address from the fetch port 31. The comparison result of the address consistency comparator 51 is supplied to the AND circuit 55.

A byte mark is supplied from the store buffer 11-i, indicating positions of data in the store buffer, to the byte mark comparator 52, and in response to a request, a byte mark from the fetch port 31, indicating positions of data required, is also supplied to the byte mark comparator 52. The byte mark comparator 52 compares the byte mark from the store buffer 11-i to the byte mark for data required in response to the request from the fetch port 31, and those byte marks are compared. When the byte mark of data required in response to the request from the fetch port 31 is less than or equal to the byte mark from the store buffer 11-i, it is determined that the byte mark comparator 52 is included in the request. Thus, the byte mark comparator 52 outputs the logical value "1". When the byte mark of data required in response to the request from the fetch port 31 is greater, the byte mark comparator 52 outputs the logical value "0". The comparison result of byte mark comparator 52 is supplied to the AND circuit 55. That is, the value of the byte mark determines a location.

The identification IID is supplied from the store buffer 11-i to the STB-IID comparator 53, and also the identification IID from the fetch port 31 in response to the request is supplied to the STB-IID comparator 53. The STB-IID comparator 53 compares the identification IID from the store buffer 11-i with the identification IID from the fetch port 31 in response to the request. When the identification IID from the store buffer 11-i is smaller than the identification IID from the fetch port 31, it is determined as an inclusive relation. Thus, the logical value "1" is output. When the identification IID from the store buffer 11-i is greater, the logical value "0" is output. The comparison result of the STB-IID comparator 53 is supplied to the AND circuit 55.

The identification IID from the fetch port 31 in response to the request is supplied to the SFB-LIMIT-IID comparator 54 and also the store fetch bypass upper limit instruction identification SFB-LIMIT-IID is supplied to the SFB-LIMIT-IID comparator 54. The SFB-LIMIT-IID comparator 54 compares the identification IID from the fetch port 31 in response to the request with the store fetch bypass upper limit instruction identification SFB-LIMIT-IID from the SBF-LIMIT-IID detecting circuit 56.

Figure 8:
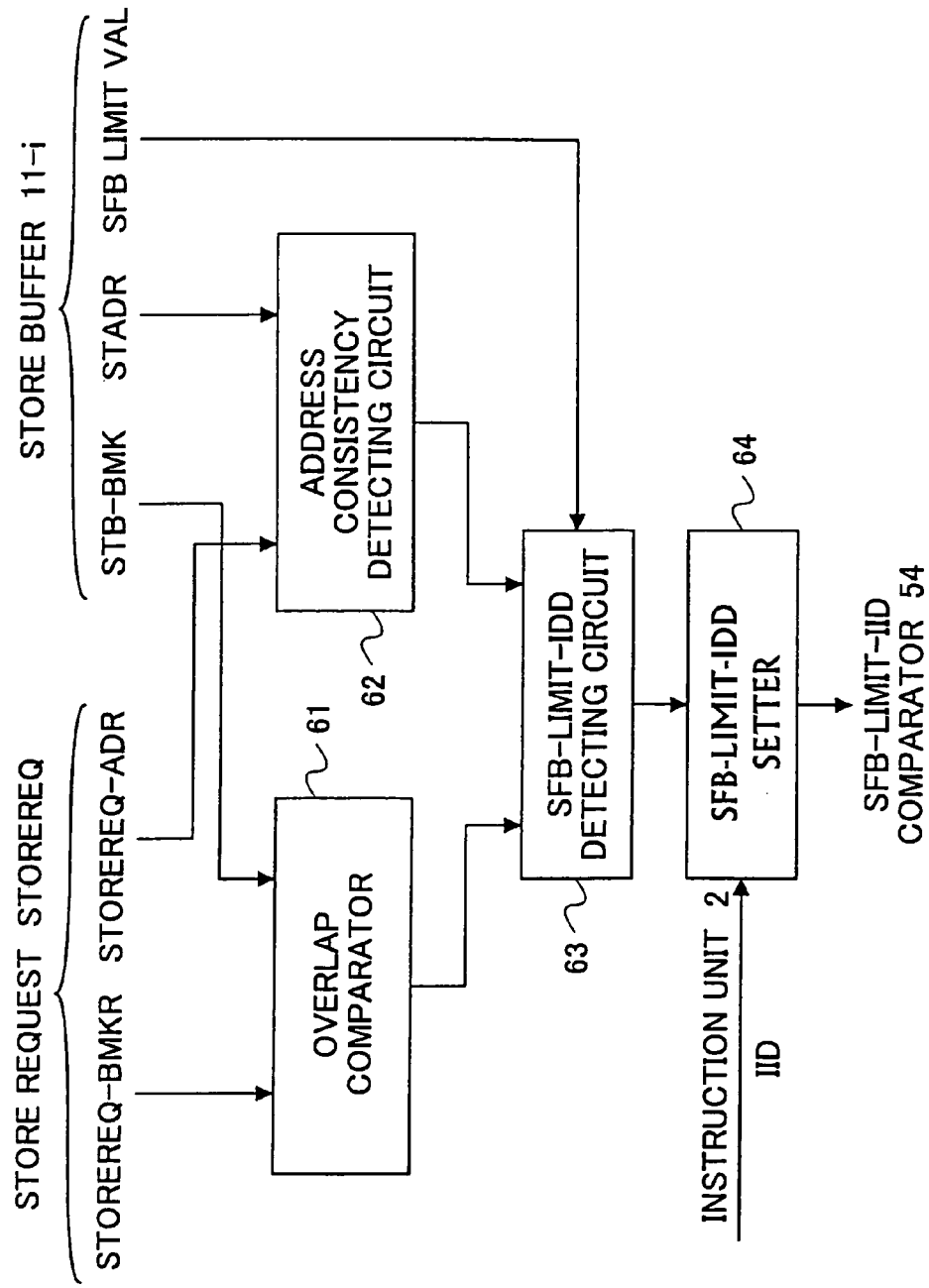
FIG. 8 is a block diagram showing a configuration of a SFB-LIMIT-IID detecting circuit according to an aspect of the present invention.

The SBF-LIMIT-IID detecting circuit 56 will be described in detail. FIG. 8 is a block diagram showing the configuration of the SFB-LIMIT-IID detecting circuit according to an aspect of the present invention.

The SBF-LIMIT-IID detecting circuit 56 includes an overlap comparator 61, an address consistency detecting circuit 62, an SFB-LIMIT-IID detecting circuit 63, and an SFB-LIMIT-IID setting setter 64. The byte mark provided in a request destination and the byte mark from the store buffer 11-i are supplied to the overlap comparator 61. The overlap comparator 61 compares and determines a consistency or an inconsistency between the byte mark provided in the request and the byte mark from the store buffer 11-i. The overlap comparator 61 outputs the logical value "1" when both byte marks are consistent with each other, and output the logical value "0" when both byte marks are inconsistent. An output of the overlap comparator 61 is supplied to the SFB-LIMIT-IID detector 63.

The address of the request destination and the address of the store buffer 11-i are supplied to the address consistency detecting circuit 62. The address consistency detecting circuit 62 compares the address of the request destination with the address of the store buffer 11-i, and checks whether or not both addresses are consistent with each other. The address consistency detecting circuit 62 outputs the logical value "1" when both addresses are consistent, and outputs the logical value "0" when both addresses are inconsistent. The logical value output from the address consistency detecting circuit 62 is supplied to the SFB-LIMIT-IID detector 63.

The SFB-LIMIT-IID detector 63 outputs the logical value "1" in a case in which the overlap comparator 61 outputs "1", the address consistency detecting circuit 62 outputs "1", and the ID valid information SFB-LIMIT-VAL is "0"; and outputs the logical value "0" in other cases.

The identification IID and the logical value of the SFB-LIMIT-IID detecting circuit 63 are supplied to the SFB-LIMIT-IID setting setter 64. The SFB-LIMIT-IID setting setter 64 sets the identification IID to the SFB-LIMIT IID when the logical value output from the SFB-LIMIT-IID detector 63 is "1". And the SFB-LIMIT-IID setting setter 64 operates nothing when the logical value is "0".

When the identification IID corresponding to the request from the fetch port 31 is smaller than the store fetch bypass upper limit instruction identification SFB-LIMIT-IID from the SFB-LIMIT-IID detecting circuit 56, an inclusive relationship exists and the SFB-LIMIT-IID comparator 54 outputs the logical value "1". The SFB-LIMIT-IID comparator 54 outputs the logical value "0" when the identification IID is greater. The comparison result of the SFB-LIMIT-IID comparator 54 is supplied to the AND circuit 55.

Comparison results of the address consistency comparator 51, the byte mark comparator 52, the STB-IID comparator 53, and the SFB-LIMIT-IID comparator 54 are supplied to the AND circuit 55. The AND circuit 55 calculates a logical product of the comparison results of the address consistency comparator 51, the byte mark comparator 52, the STB-IID comparator 53, and the SFB-LIMIT-IID comparator 54. The AND circuit 55 outputs the logical value "1" when all comparison results of the address consistency comparator 51, the byte mark comparator 52, the STB-IID comparator 53, and the SFB-LIMIT-IID comparator 54 are the logical value "1". The AND circuit 55 outputs the logical value "0" when other states occur. An output of the AND circuit 55 is supplied to the fetch data selecting circuit 16, the store address selecting circuit 36, the store data selecting circuit 37, and the checking circuit 38.

The fetch data selecting circuit 16 selects store information from the store buffers 11-1 through 11-*n* corresponding to the judgment results from the judging circuits 39-1 through 39-*n*. Data selected by the fetch data selecting circuit 16 are supplied to the arithmetic unit 4.

Figure 9:
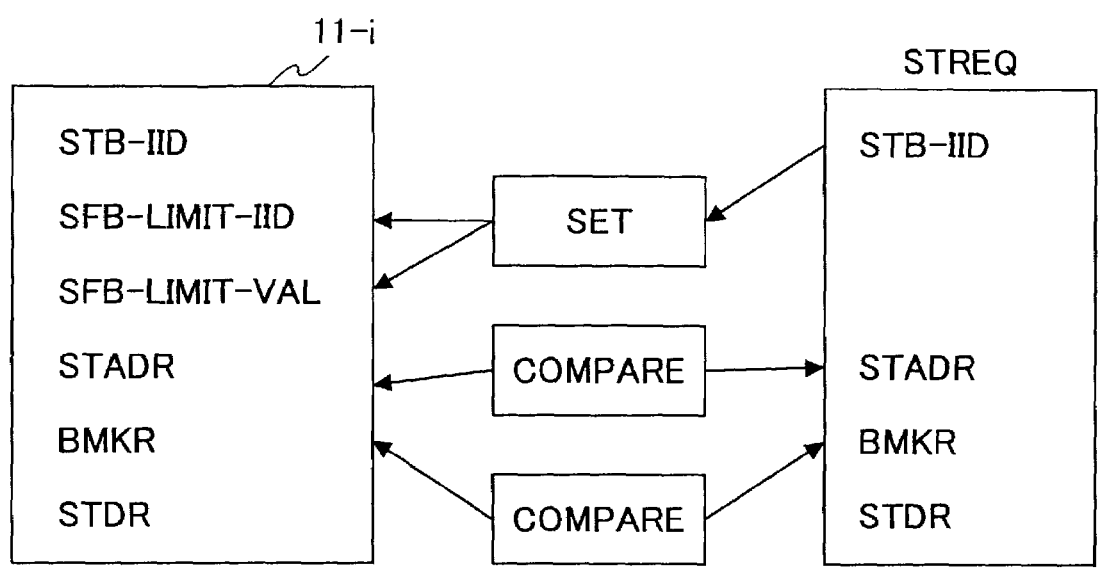
FIG. 9 is a diagram for explaining an operation according to an aspect of the present invention.
Figure 10:
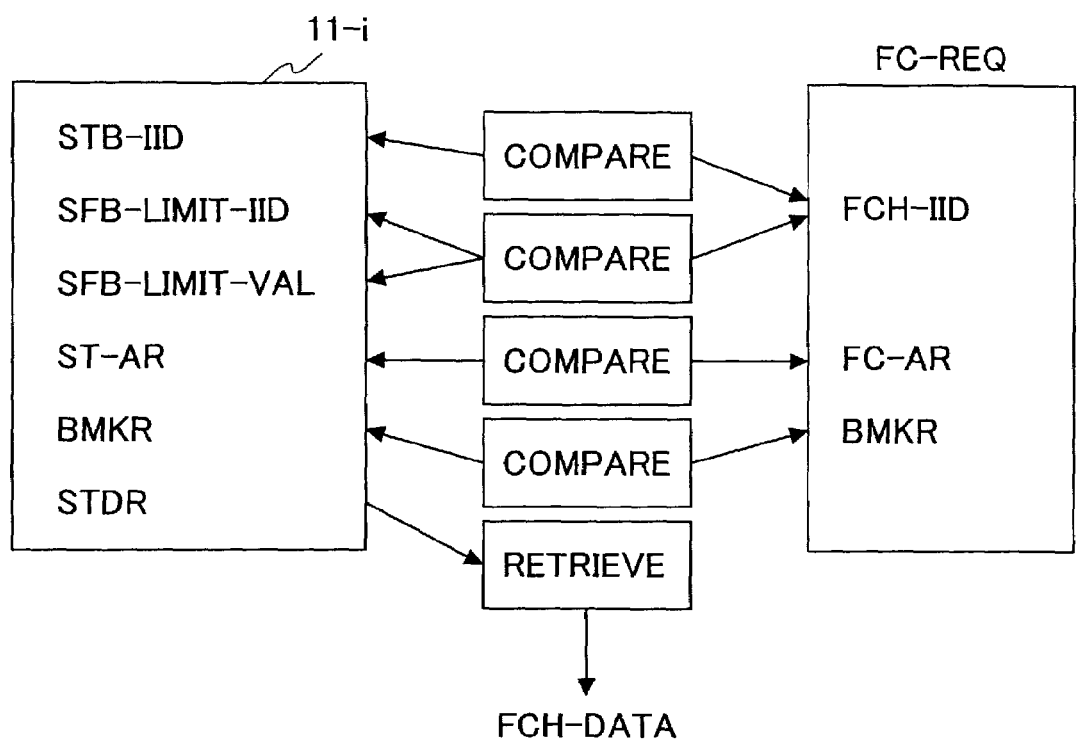
FIG. 10 is a diagram for explaining an operation according to an aspect of the present invention.

Next, an operation according to an aspect of the present invention will be described. FIG. 9 and FIG. 10 are diagrams for explaining the an operation according to an aspect of the present invention. FIG. 9 shows a state in which the data issue requests have been already issued to the store buffers 11-1 through 11-*n* but data have not been stored to the cache memory 12 or the main memory 5. When the data issue requests are issued to the store buffers 11-1 through 11-*n*, the identification information IID showing the execution order for each of the requests is stored. The identification information IID is stored to the store buffer 11-*i*.

Also, an address STAR used to indicate a store destination of a store request ST REQ and a store byte mark BMKR for showing an area to store are simultaneously stored to the store buffer 11-*i*. The store data STDR is set to a corresponding address when the store data are prepared later.

Next, when a following store request ST REQ is issued, the store address STAR and the store byte mark BMKR of the store buffer 11-*i* are compared with those of the following store request ST REQ. In this case, the store buffer 11-*i*, to which the ID valid information SFB-LIMIT-VAL is not informed, is to be compared. By comparing based on the ID valid information SFB-LIMIT-VAL, it is possible to narrow a range for a bypass.

As a comparison result from comparing the store address STAR and the store byte mark BMRK of the store buffer 11-*i* and those of the store request ST REQ, when an overlap between one area to be operated for the store request ST REQ and another area to be operated for a preceding store request ST REQ is detected, it is determined to store to the same area. In this case, with respect to the store buffer 11-*i* where the overlap is detected, the identification STB-IID of the store request ST REQ is set as the store fetch bypass upper instruction identification SFB-LIMIT-IID and also the ID valid information SFB-LIMIT-VAL is set as valid.

As described above, the identification IID of the fetch request FC REQ, which is subject to store fetch bypass from each of the store buffers 11-1 through 11-*n*, is set when the store request STREQ is issued. When the ID valid information SFB-LIMIT-VAL is valid, the identification FCH-IID of the fetch request FC REQ, which is subject for store fetch bypass from the store buffer 11-*i*, is determined as identification IID from the identification STB-IID set in the store buffers to the store fetch bypass upper limit instruction identification SFB-LIMIT-IID. When the ID valid information SFB-LIMIT-VAL is not valid, all identification IID after the identification STB-IID is set in the store buffers 11-1 through 11-*i*.

Next, an operation for fetching to the store buffers 11-1 through 11-*n* will be described. As shown in FIG. 10, the range of the fetch request FC REQ subject for the store fetch bypass is determined. Regarding to the fetch request FC REQ issued later, the IID, the address, and the byte mark are compared with those in all store buffers 11-1 through 11-*n*. When the identification STB-IID of each store buffer 11-*i* is compared with the identification FCH-IID of the fetch instruction, the identification FCH-IID of the fetch instruction is checked to be later than the identification STB-IID of each store buffer 11-*i*. When the identification SFB-LIMIT-IID is compared with the identification FCH-IID, an issuance order of the identification FCH-IID is checked to be later than that of the identification SFB-LIMIT-IID.

It should be noted that when the ID valid information SFB-LIMIT-VAL is not valid, it is not necessary to compare the identification SFB-LIMIT-IID with the identification FCH-IID. In addition, the store address STAR is compared with the fetch address FCAR and the consistency is confirmed.

Moreover, the store byte mark BMKR is compared with the fetch byte mark BMKR, and it is checked whether or not the store byte mark BMRK includes the fetch byte mark BMRK. It is possible to confirm by a check result that the entire area to be operated on by the fetch request FC REQ is included in a single store buffer. As described above, it is possible to select only one store buffer by comparing the IIDs, the addresses, and the byte marks BMRK.

Next, an operation according to an aspect will be described with reference to a timing chart. Timing charts are shown in FIG. 11, according to an aspect of the present invention.

FIG. 11A is a diagram showing an execute timing of a store ST1, FIG. 11B is a diagram showing a store data issue timing of the store ST1, FIG. 11C is a diagram showing a store permit timing of a store buffer STB1, FIG. 11D is a diagram showing a write timing of the store buffer STB1, FIG. 11E is a diagram showing the execution timing of a fetch FETCH1, FIG. 11F is a diagram showing a waiting time of the fetch FETCH1, FIG. 11G is a diagram showing the execute timing of a store ST2, FIG. 11H is a diagram showing the store data issue timing of the store ST2, FIG. 11I is a diagram showing the store permit timing of a store buffer STB2, FIG. 11J is a diagram showing the store permit timing of the store buffer STB2, FIG. 11K is a diagram showing the execute timing of a fetch FETCH2, FIG. 11L is a diagram showing the waiting time of the fetch FETCH2, FIG. 11M is a diagram showing a store data preparation period of the store buffer STB1, FIG. 11N is a diagram showing the store data preparation period of the store buffer STB2, FIG. 11O is a diagram showing a recycle execute timing of the FETCH 1, FIG. 11P is a diagram showing the fetch successful timing of the fetch FETCH1, FIG. 11Q is a diagram showing the recycle execute timing of the fetch FETCH2, FIG. 11R is a diagram showing the fetch successful timing of the fetch FETCH2, and FIG. 11S is a diagram showing an output timing of selected data.

Figure 11:
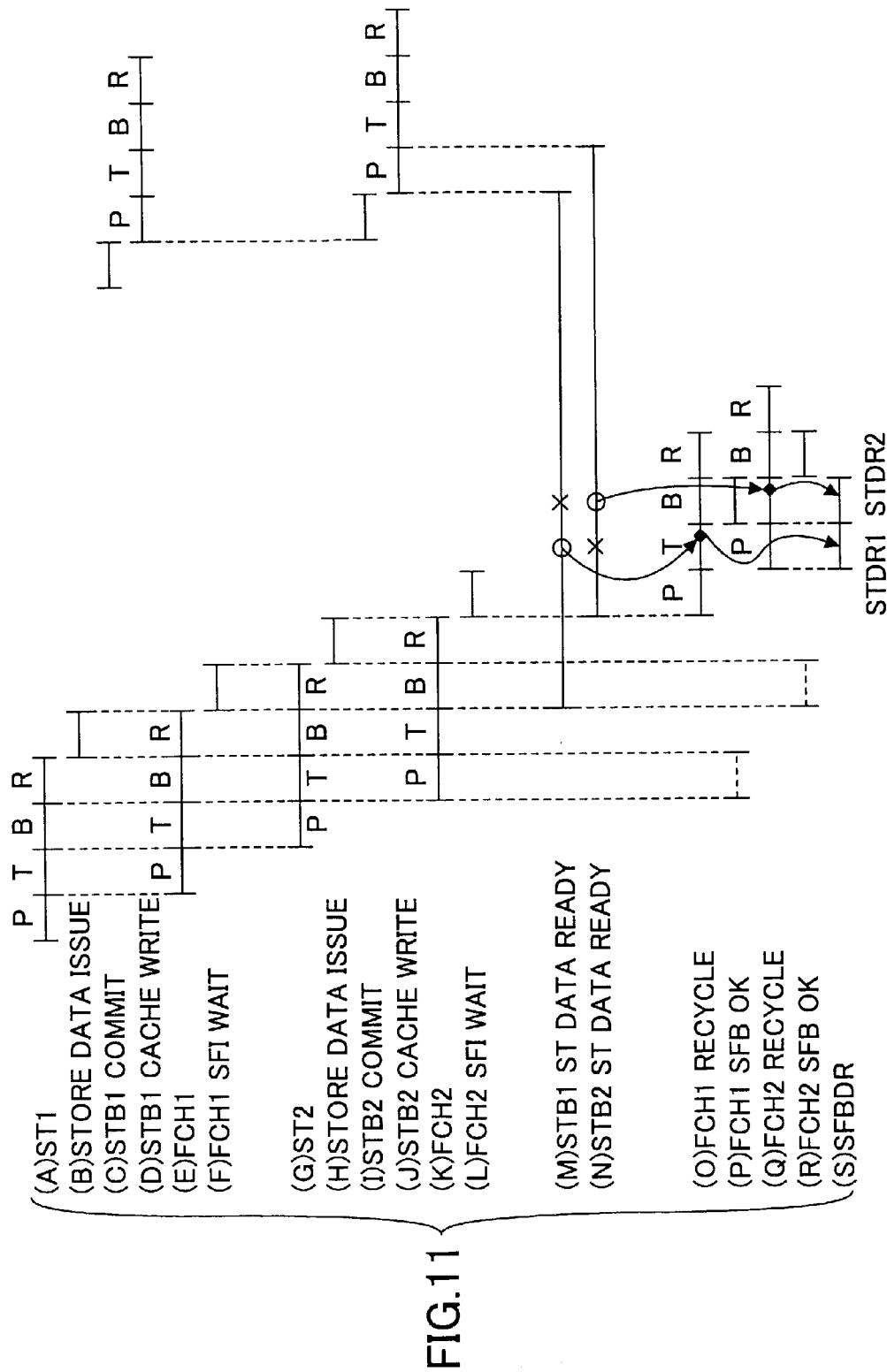
FIG. 11 is a timing chart according to an aspect of the present invention.

As shown in FIG. 11, the stores ST1 and ST2, and the fetches FETCH1 and FETCH2 are processed by a pipeline processing method. In this case, even if the same address is valid in the store buffers STB1 and STB2 as shown in FIG. 11M and FIG. 11N, data are identified by the identification IID and then it is possible to fetch in order of the store data STRD1 and STRD2.

According to an aspect of the present invention, in a case in which a plurality of the fetch requests simultaneously conduct a search for all store buffers with respect to the store fetch bypass, it is possible to properly select a different store buffer for each of the plurality of the fetch requests. Thus, it is possible to conduct a speedy execution for a plurality of the fetch requests and the store requests in a super scalar processor conducting an out-of-order process. Therefore, it is possible to improve the performance of the processing unit.

According to an aspect of the present invention, the store fetch bypass upper limit instruction identification SFB-LIMIT-IID is set by a store buffer unit but can also be set by a byte mark unit. In the latter case in which the store fetch bypass upper limit instruction identification SFB-LIMIT-IID is set by a byte mark unit, the overlap of the area to be operated on is confirmed by the byte mark unit but not the entire store buffer unit. Also, the store fetch bypass upper limit instruction identification SFB-LIMIT-IID and the ID valid information SFB-LIMIT-VAL are maintained by the byte mark unit.

Moreover, when the fetch request FC REQ is checked, it is not necessary to include areas to be fetched in a single store buffer. Therefore, it is possible to fetch while bypassing the store buffers. In this case, if necessary, it is possible to combine data read from the cache memory 12 or the main memory 5. Furthermore, it is possible to fetch using only a few bytes without the byte mark.

The invention claimed is:

1. A storage control device, comprising:
    a plurality of storages storing data; and
    a storage controller receiving a data issue request identifying an execution order to store data is supplied,
    wherein the storage controller selects a storage from said plurality of storages based on the data issue request, and outputs data, from the selected storage, corresponding to an address in the selected storage.

2. The storage control device as claimed in claim 1, wherein each of said plurality of storages associates a separate identification to the data issue request corresponding to the requested data, and said storage controller compares the identifications associated with the data issue request with a plurality of identifications previously stored in said plurality of storages and identifies the selected storage based on the comparison of the associated identification with the previously stored identification.

3. The storage control device as claimed in claim 2, wherein said selected storage stores a range setting identification indicating a range to be operated on, and said storage controller identifies data to be operated on that corresponds to said range setting identification.

4. A storage control method, comprising:
    providing a data issue request identifying an execution order to store data;
    comparing separate identifications of each of a plurality of storages with the identification in the data issue request;
    selecting a storage based on the comparison; and
    outputting data from the selected storage that corresponds to an address.

5. The storage control device as claimed in claim 1, wherein said selected storage stores a range setting identification indicating a range to be operated on, and said storage controller identifies data to be operated on that corresponds to said range setting identification.

* * * * *